United States Patent [19]
Hayashi et al.

[11] Patent Number: 5,483,584
[45] Date of Patent: Jan. 9, 1996

[54] PUSHBUTTON TELEPHONE SYSTEM

[75] Inventors: Hiroaki Hayashi, Hino; Takashi Aoki, Akishima, both of Japan

[73] Assignee: Toshiba Corporation, Kanagawa, Japan

[21] Appl. No.: 185,026

[22] Filed: Jan. 24, 1994

[30] Foreign Application Priority Data

Jan. 25, 1993 [JP] Japan ................... 5-009923

[51] Int. Cl.⁶ .................................................. H04M 1/00
[52] U.S. Cl. ..................... 379/156; 379/162; 379/163; 379/161
[58] Field of Search ........................... 379/156, 157, 379/161, 162, 163, 165, 393

[56] References Cited

U.S. PATENT DOCUMENTS

| | | | |
|---|---|---|---|
| 4,032,729 | 6/1977 | Matheny | 379/161 X |
| 4,096,358 | 6/1978 | Bidlack et al. | 379/162 X |
| 4,280,022 | 7/1981 | Sekiguchi et al. | 379/162 X |
| 4,607,144 | 9/1986 | Carmon et al. | 379/162 X |

*Primary Examiner*—Stephen Chin
*Assistant Examiner*—Paul Loomis
*Attorney, Agent, or Firm*—Finnegan, Henderson, Farabow, Garrett & Dunner

[57] ABSTRACT

A telephone connection is established between a pushbutton telephone set and one of telephone lines through a pushbutton telephone set unit, a speech highway, and a telephone line unit. When one of line and extension keys of the pushbutton telephone set is pressed by the user during the telephone connection, a CPU in a control unit determines whether the telephone connection is being made based on the period of time that has elapsed after the pushbutton telephone set has captured the telephone line. If the telephone connection is being made as determined by the CPU, then the CPU controls a time switch circuit according to hold function data stored in a RAM to connect the telephone line unit to a hold tone generator through the speech highway, thus holding the telephone connection. Thereafter, the CPU captures a telephone line corresponding to the depressed one of the line and extension keys.

25 Claims, 11 Drawing Sheets

PUSHBUTTON TELEPHONE SYSTEM

BACKGROUND OF THE INVENTION

1. Field of the Invention

The present invention relates to a pushbutton telephone system capable of holding a telephone connection that has been established by a call.

2. Description of the Prior Art

There has been known a pushbutton telephone system having a main controller and a plurality of pushbutton telephone sets. The main controller controls connections between the pushbutton telephone sets and also connections between the pushbutton telephone sets and a plurality of telephone lines.

Figure 1:
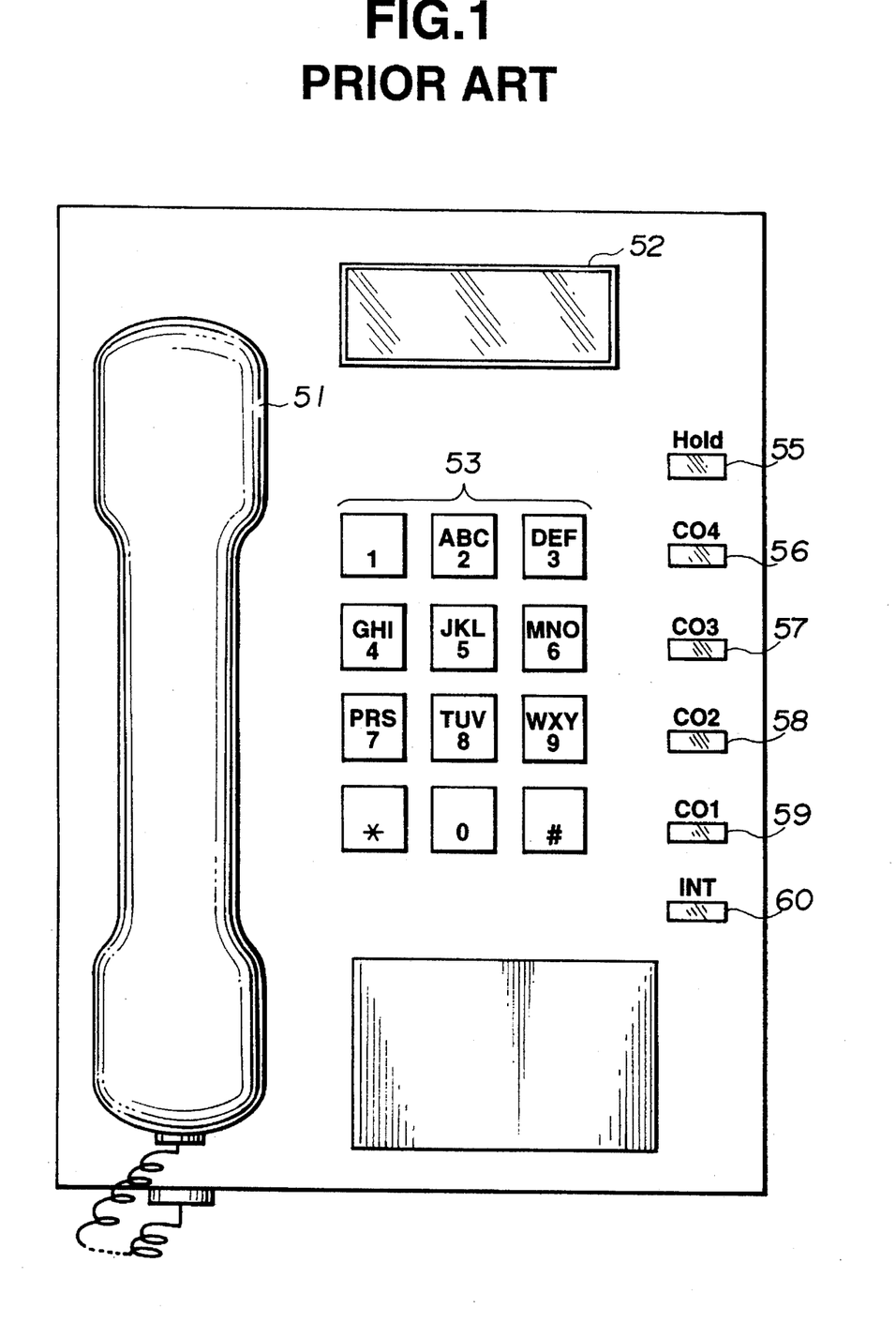
FIG. 1 is a plan view of a pushbutton telephone set of a conventional pushbutton telephone system.

FIG. 1 of the accompanying drawings shows each of such pushbutton telephone sets. As shown in FIG. 1, the pushbutton telephone set comprises a handset 51, a liquid crystal display (LCD) panel 52 for displaying operation data, a pushbutton dialing pad 53, a hold key 55, a plurality of line keys 56, 57, 58, 59, and an extension key 60.

When the pushbutton telephone set shown in FIG. 1 responds to an incoming call routed through any one of the telephone lines, the user of the pushbutton telephone set picks up the handset 51 and presses one of the line keys 56–59 which corresponds to the telephone line that carries the incoming call, thereby establishing a telephone connection to the calling party through the telephone line and a telephone circuit network connected thereto. Occasionally, during the call, the user wishes to make an outgoing call through another telephone line or an extension line in order to make an inquiry, for example, as required by the incoming call. At this time, the user presses the hold key 55 to maintain the telephone connection initiated by the incoming call. Then, the user makes an outgoing call by pressing a desired one of the line keys 56–59 and the extension key 60. In this process of setting up a new connection, the user may first press one of the line keys 56–59 and the extension key 60 without pressing the hold key 55 due to an oversight. If the user presses one of the line keys 56–59 and the extension key 60 without holding the original call, then the telephone line carrying the original call is disconnected rather than being maintained. Such a drawback would be eliminated if all the telephone lines that carry calls were maintained when one of the line keys 56–59 and the extension key 60 is pressed during the calls. However, this solution would be disadvantageous because any other telephone lines that are not in service would also be maintained and not available for calls.

Because of the above shortcoming, care should be exerted in using the conventional pushbutton telephone system particularly when a new connection is to be set up while a previously established call is being maintained.

SUMMARY OF THE INVENTION

It is therefore an object of the present invention to provide a pushbutton telephone system which is capable of preventing a telephone line in service from being disconnected when a line or extension key is pressed without holding the telephone line, allowing the user to switch reliably to another line, of permitting the user to clearly recognize a hold function that is set to hold the telephone line in service, and of automatically disabling the hold function when an entered telephone number or a busy tone is detected during the hold function, so that the user can operate a pushbutton telephone set efficiently without concern over the setting of the hold function.

According to the present invention, there is provided a pushbutton telephone system comprising a plurality of telephone lines and an extension line, at least one pushbutton telephone set connected to the telephone lines and the extension line and having a plurality of line keys associated with the telephone lines, respectively, and an extension key associated with the extension line, decision means for determining whether one of the telephone lines is carrying a call when one of the line keys and the extension key is pressed, based on a period of time which elapses after the pushbutton telephone set captures the one of the telephone lines until the one of the line keys and the extension key is pressed, holding means for holding the one of the telephone lines which is carrying a call when the one of the line keys and the extension key is pressed if the one of the telephone lines is determined as carrying a call by the decision means, and control means for controlling the pushbutton telephone set to capture one of the telephone lines and the extension line which corresponds to the pressed one of the line keys and the extension key when the one of the telephone lines which is carrying a call is held by the holding means.

The holding means may comprise means for holding the one of the telephone lines which is carrying a call for 2 seconds.

The pushbutton telephone system may further comprise setting means for setting and modifying a period of time for which the one of the telephone lines which is carrying a call is held by the holding means. The pushbutton telephone system may further comprise telephone number detecting means for detecting a telephone number signal representing a telephone number which is dialed by the pushbutton telephone set during the period of time set by the setting means, and indicating means for sending a signal indicating the disabling of the hold function to the pushbutton telephone set when a telephone number signal is detected by the telephone number detecting means. The pushbutton telephone set may have visual display means for displaying visual information represented by the signal indicating the setting of a hold function, further comprising means for de-energizing the visual display means when the signal indicating the disabling of the hold function is sent from the indicating means to the pushbutton telephone set. The pushbutton telephone system may further comprise synthetic speech supply means for supplying a synthetic speech signal indicating the setting of a hold function to hold the one of the telephone lines which is carrying a call with the holding means to the pushbutton telephone set when the decision means starts to determine whether the one of the telephone lines is carrying a call based on the period of time, and means for de-energizing the synthetic speech supply means when the signal indicating the disabling of the hold function is sent from the indicating means to the pushbutton telephone set. The pushbutton telephone set may have light-emitting means for emitting light as the signal indicating the setting of a hold function, further comprising means for de-energizing the light-emitting means when the signal indicating the disabling of the hold function is sent from the indicating means to the pushbutton telephone set. The pushbutton telephone set may have buzzer means for producing a buzzer sound represented by the signal indicating the setting of a hold function, further comprising means for de-energizing the buzzer means when the signal indicating the disabling of the hold function is sent from the indicating means to the pushbutton telephone set. Alternatively, the pushbutton telephone system may further comprise busy tone detecting means for detecting a busy tone signal from one of the telephone lines which corresponds to one of the line keys that is pressed during the period of time set by the setting means, and indicating means for sending a signal indicating the disabling of the hold function to the pushbutton telephone set when a busy tone signal is detected by the busy tone detecting means. The pushbutton telephone set may have visual display means for displaying visual information represented by the signal indicating the setting of a hold function, further comprising means for de-energizing the visual display means when the signal indicating the disabling of the hold function is sent from the indicating means to the pushbutton telephone set. The pushbutton telephone system may further comprise synthetic speech supply means for supplying a synthetic speech signal indicating the setting of a hold function to hold the one of the telephone lines which is carrying a call with the holding means to the pushbutton telephone set when the decision means starts to determine whether the one of the telephone lines is carrying a call based on the period of time, and means for de-energizing the synthetic speech supply means when the signal indicating the disabling of the hold function is sent from the indicating means to the pushbutton telephone set. The pushbutton telephone set may have light-emitting means for emitting light as the signal indicating the setting of a hold function, further comprising means for de-energizing the light-emitting means when the signal indicating the disabling of the hold function is sent from the indicating means to the pushbutton telephone set. The pushbutton telephone set may have buzzer means for producing a buzzer sound represented by the signal indicating the setting of a hold function, further comprising means for de-energizing the buzzer means when the signal indicating the disabling of the hold function is sent from the indicating means to the pushbutton telephone set.

The pushbutton telephone system may further comprise indicating means for sending a signal indicating the setting of a hold function to hold the one of the telephone lines which is carrying a call with the holding means to the pushbutton telephone set when the decision means starts to determine whether the one of the telephone lines is carrying a call based on the period of time, and sending a signal indicating the disabling of the hold function to the pushbutton telephone set when the period of time elapses. The pushbutton telephone set may have visual display means for displaying visual information represented by the signal indicating the setting of a hold function. The visual display means may comprise means for displaying the visual information as letters, or light-emitting means for emitting light as the visual information. The light-emitting means may comprise means for emitting flickering light as the visual information. The light-emitting means may comprise a plurality of light-emitting elements positioned in the line keys, respectively, or a plurality of light-emitting elements positioned near the line keys, respectively. The light-emitting means may comprise two-color light-emitting means for alternately and intermittently turning on two color signals. The pushbutton telephone set may have buzzer means for producing a buzzer sound represented by the signal indicating the setting of a hold function. The buzzer means may comprise means for producing an intermittent buzzer sound represented by the signal indicating the setting of a hold function.

The pushbutton telephone system may further comprise synthetic speech supply means for supplying a synthetic speech signal indicating the setting of a hold function to hold the one of the telephone lines which is carrying a call with the holding means to the pushbutton telephone set when the decision means starts to determine whether the one of the telephone lines is carrying a call based on the period of time. The pushbutton telephone set may have audio output means for producing a sound represented by the synthetic speech signal which is supplied to the pushbutton telephone set.

With the above arrangement, the decision means determines whether one of the telephone lines is carrying a call when one of the line keys and the extension key is pressed, based on a period of time which elapses after the pushbutton telephone set captures the one of the telephone lines until the one of the line keys and the extension key is pressed. If one of the telephone lines is carrying a call, i.e., in service, the call over the telephone line is maintained, and the telephone line which corresponds to the depressed one of the line and extension keys is captured by the pushbutton telephone set. Therefore, the telephone line in service is prevented from being disconnected when one of the line and extension keys is pressed without pressing a hold key, and the user is allowed to switch reliably to another line corresponding to the depressed one of the line and extension keys.

The setting of the hold function is indicated by indicated by displayed visual information, a synthetic sound, a buzzer sound, and/or the flickering of light-emitting elements. Thus, the user can quickly recognize the setting of the hold function and can operate the pushbutton telephone set highly efficiently without being puzzled in switching between the lines.

When a telephone number is dialed or a busy tone is detected while the hold function is being set, the hold function is forcibly disabled. Accordingly, the user can operate the pushbutton telephone set highly efficiently without concern over the setting of the hold function.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 2:
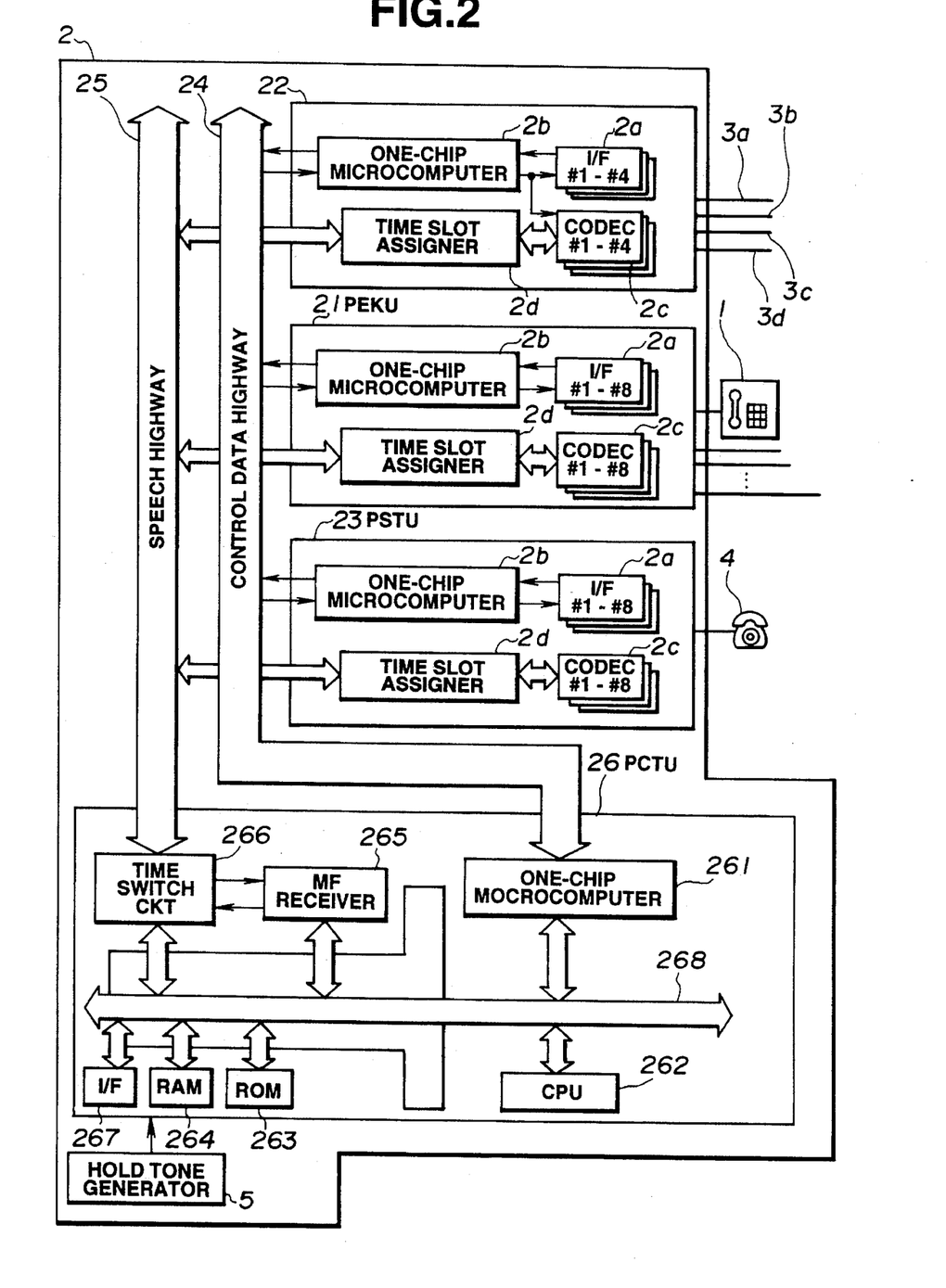
FIG. 2 is a block diagram of a pushbutton telephone system according to a first embodiment of the present invention.

As shown in FIG. 2, a pushbutton telephone system according to a first embodiment of the present invention includes a main controller 2 connected to a plurality of telephone lines 3a, 3b, 3c, 3d, a plurality of pushbutton telephone sets 1, and a standard telephone set 4.

The main controller 2 includes a pushbutton telephone set unit 21 connected to the pushbutton telephone sets 1, a telephone line unit 22 connected to the telephone lines 3a, 3b, 3c, 3d, and a standard telephone set unit 23 connected to the standard telephone set 4. The main controller 2 also has a control unit 26 that is connected to the pushbutton telephone set unit 21, the telephone line unit 22, and the standard telephone set unit 23 through a control data highway 24 and a speech highway 25. Each of the pushbutton telephone set unit 21, the telephone line unit 22, and the standard telephone set unit 23 has a plurality of interfaces 2a, a one-chip microcomputer 2b, a plurality of codecs 2c, and a time slot assigner 2d. The one-chip microcomputer 2b is connected to the control data highway 24. The time slot assigner 2d is connected to the speech highway 25.

The control unit 26 has a one-chip microcomputer 261, a 16-bit central processing unit (CPU) 262, a read-only memory (ROM) 263, a random-access memory (RAM) 264, an MF receiver 265, a time switch circuit 266, an interface 267, and a bus 268. The one-chip microcomputer 261, the CPU 262, the ROM 263, the RAM 264, the MF receiver 265, the time switch circuit 266, and the interface 267 are connected to the bus 268. The interface 267 is connected to a hold tone generator 5.

Operation of the pushbutton telephone system according to the first embodiment will be described below.

When an incoming call arrives through the telephone line 3a, for example, the call signal is supplied through the corresponding interface 2a to the one-chip microcomputer 2b in the telephone line unit 22.

The incoming call is detected by the one-chip microcomputer 2b, which indicates the detected incoming call to the CPU 262 through the control bus highway 24 and the onechip microcomputer 261. In order to indicate the telephone line 3a which carries the incoming call, the CPU 262 sends a control signal through the one-chip microcomputer 261 to the control bus highway 24. In response to the control signal, the one-chip microcomputer 2b in the pushbutton telephone set unit 21 supplies a signal through the interfaces 2a to the respective pushbutton telephone sets 1 to illuminate their line key which corresponds to the telephone line 3a which carries the incoming call. When the user responds to the incoming call by pressing the line key corresponding to the telephone line 3a on one of the pushbutton telephone sets 1, a response signal is supplied from the pushbutton telephone set unit 21 through the control data highway 24 and the one-chip microcomputer 261 to the CPU 262. In response to the supplied response signal, the CPU 262 controls the time switch circuit 266 to interconnect the time slot assigner 2d in the telephone line unit 22 and the time slot assigner 2d in the pushbutton telephone set unit 21 through the speech highway 25, establishing a telephone connection between the pushbutton telephone set 1 and the calling party.

If the user wishes to make an outgoing call through one of the other telephone lines 3b–3d or an extension line during the telephone connection, then the user presses the line key corresponding to one of the other telephone lines 3b–3d or an extension key corresponding to the extension line on the pushbutton telephone set 1.

Figure 3:
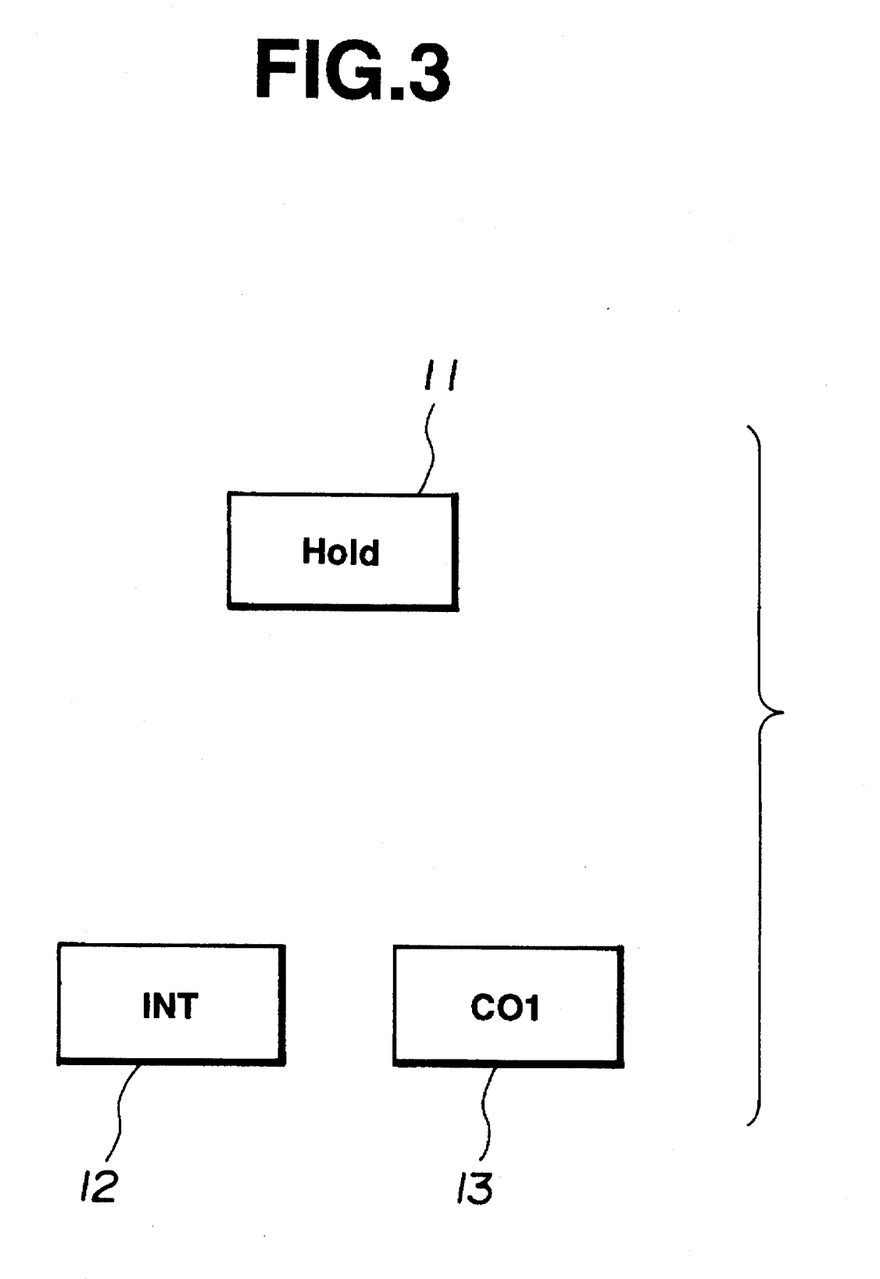
FIG. 3 is a diagram showing a hold key, a line key, and an extension key on a pushbutton telephone set connected to the pushbutton telephone system shown in FIG. 2.

FIG. 3 shows a hold key 11, a line key 13, and an extension key 12 on the pushbutton telephone set 1. If the user wishes to make an outgoing call during the telephone connection, then the user presses the line key 13 or the extension key 12. Data indicating that the line key 13 or the extension key 12 is pressed are supplied from the pushbutton telephone set unit 21 through the control data highway 24 and the one-chip microcomputer 261 to the CPU 262.

Figure 4:
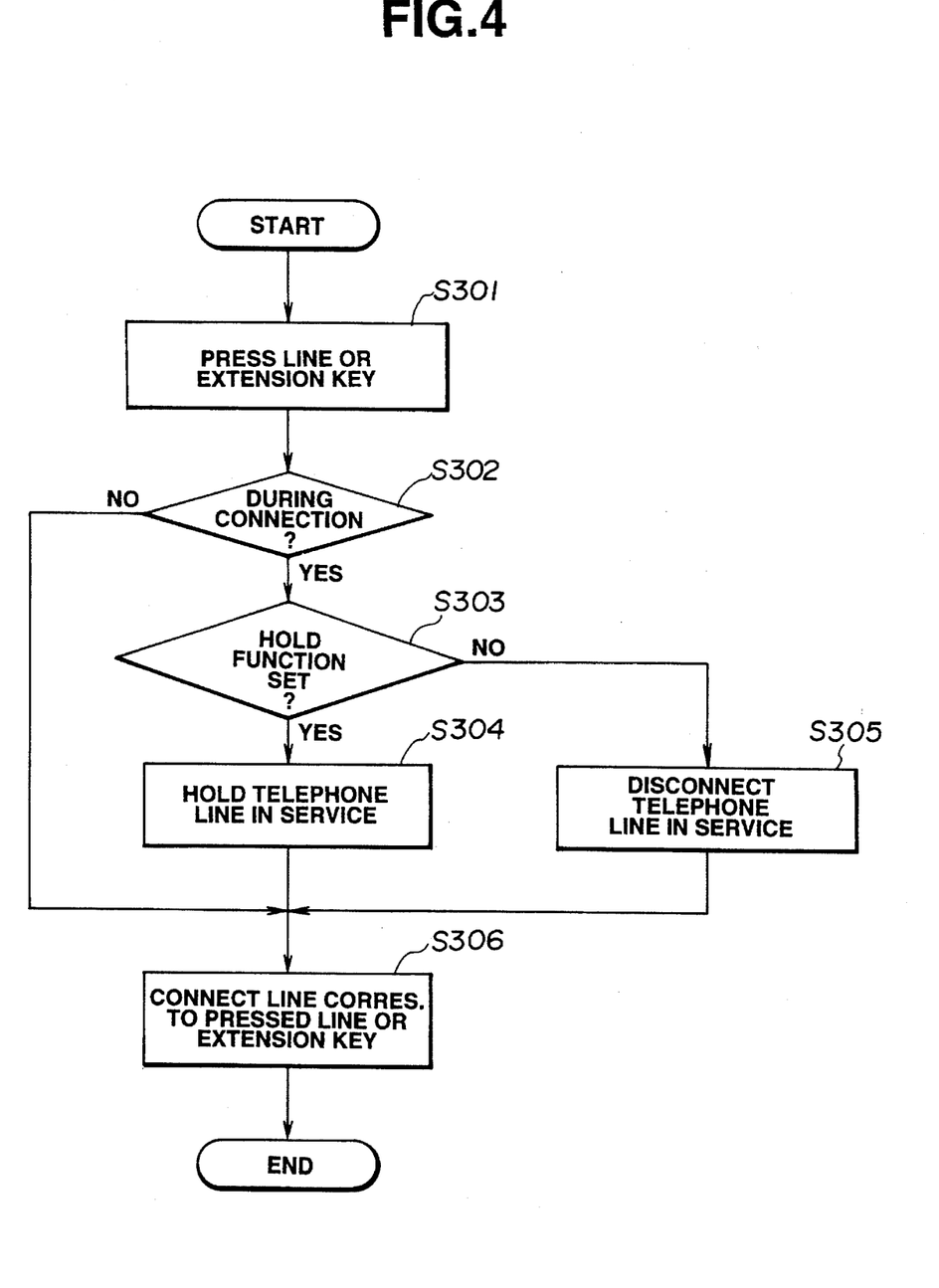
FIG. 4 is a flowchart of a processing sequence that is executed when a line key or an extension key on a pushbutton telephone set is pressed during a telephone connection.

FIG. 4 illustrates a processing sequence that is executed by the CPU 262 when the line key 13 or the extension key 12 on the pushbutton telephone set 1 is pressed during the telephone connection. In this embodiment, the RAM 264 has already stored preset data indicative of whether a telephone line that carries a call, i.e., a telephone line in service, is to be maintained (a hold function is set) or disconnected (no hold function is set) when the line key or the extension key is pressed during a telephone connection. A program for instructing the CPU 262 to carry out the processing sequence shown in FIG. 4 is stored in the ROM 263.

In FIG. 4, the CPU 262 detects when the line key 13 or the extension key 12 on the pushbutton telephone set 1 is pressed in a step S301. Then, the CPU 262 determines whether a telephone connection is being established to the pushbutton telephone set 1 through another telephone line in a step S302. If no telephone connection is being established, then control jumps to a step S306. If a telephone connection is being established, then control proceeds to a step S303. The step S302 will be described in greater detail. In the step S302, the CPU 262 determines a period of time that has elapsed from the capture of the telephone line by the pushbutton telephone set 1 when the line key 13 or the extension key 12 on the pushbutton telephone set 1 is pressed. If the period of time that has elapsed is equal to or shorter than a predetermined period of time, e.g., 2 seconds, then the CPU 262 judges that the depression of the line key 13 or the extension key 12 is merely a repeated ineffective depression, i.e., no telephone connection is being established. If the period of time that has elapsed is longer than 2 seconds, then the CPU 262 judges that a telephone connection is being established to the pushbutton telephone set 1.

Thereafter, the CPU 262 checks the data stored in the RAM 264 to determine whether a hold function is set or not when the line key 13 or the extension key 12 is pressed in a step S303. If no hold function is set, then control goes to a step S305 in which the telephone line that carries the call is disconnected. Thereafter, control goes from the step S305 to the step S306. If a hold function is set in the step S303, then the CPU 262 controls the time switch circuit 266 to connect the time slot assigner 2d in the telephone line unit 22 to the interface 267 through the speech highway 25, and also energizes the hold tone generator 5 to supply a hold tone to the pushbutton telephone set 1 thereby holding the telephone line that carries the call.

In the next step S306, responsive to the depression of the line key 13 or the extension key 12 on the pushbutton telephone set 1, the CPU 262 controls either the one-chip microcomputer 2b in the telephone line unit 22 or the one-chip microcomputer 2b in the standard telephone set unit 23 through the one-chip microcomputer 261 and the control data highway 24 thereby to connect the line corresponding to the depressed line key or extension key to the pushbutton telephone set 1. The processing sequence shown in FIG. 4 now comes to an end. After the processing sequence shown in FIG. 4, an outgoing call is made through the line corresponding to the depressed line key or extension key.

Figure 5:
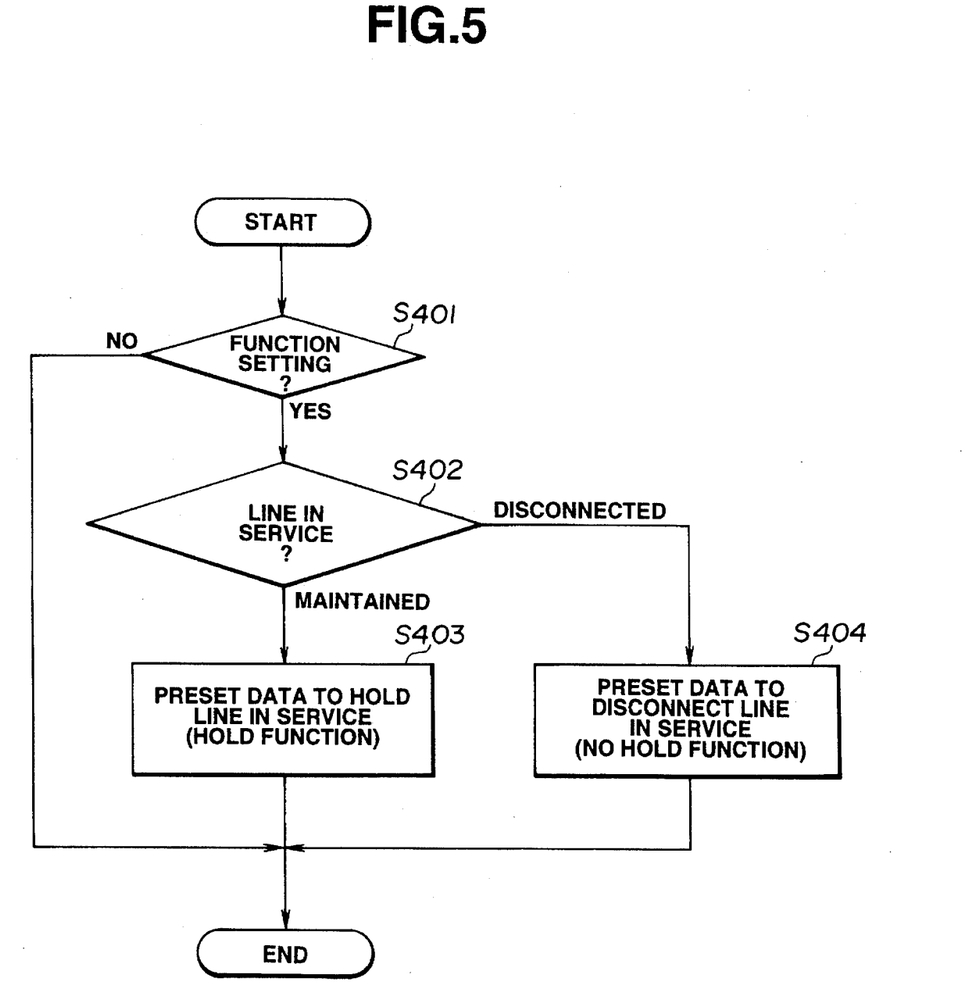
FIG. 5 is a flowchart of a processing sequence that is executed when preset data indicative of whether a telephone line in service is to be maintained or disconnected are to be stored in a RAM.

FIG. 5 illustrates a processing sequence that is executed by the CPU 262 when preset data indicative of whether a telephone line that carries a call is to be maintained (a hold function is set) or disconnected (no hold function is set) are to be stored in the RAM 264 in preparation for the capture of another line by the pushbutton telephone set 1 during the telephone connection. A program for instructing the CPU 262 to carry out the processing sequence shown in FIG. 5 is stored in the ROM 263.

As shown in FIG. 5, the user presses a given key on the pushbutton telephone set 1 to send a function setting request from the pushbutton telephone set unit 21 through the control data highway 24 and the one-chip microcomputer 261 to the CPU 262. The CPU 262 determines whether the delivered function setting request is representative of a function setting from the pushbutton telephone set 1 or not in a step S401. If it is not a function setting from the pushbutton telephone set 1, then the processing sequence is finished. If it is a function setting from the pushbutton telephone set 1, then control proceeds to a step S402. The user presses a certain key on the pushbutton telephone set 1 to preset or register data indicative of whether a telephone line that carries a call is to be maintained or disconnected at the time another line is to be captured by the pushbutton telephone set 1 during the telephone connection. In the step S402, the CPU 262 determines whether a telephone line that carries a call is to be maintained or disconnected based on the depressed key. If to be disconnected, control goes to a step S404, and if to be maintained, control goes to a step S403. In the step S403, the CPU 262 presets or registers, in the RAM 264, the data indicating that a telephone line that carries a call is to be maintained, i.e., a hold function is set, at the time another line is to be captured by the pushbutton telephone set 1 during the telephone connection. In the step S404, the CPU 262 presets or registers, in the RAM 264, the data indicating that a telephone line that carries a call is to be disconnected, i.e., no hold function is set, at the time another line is to be captured by the pushbutton telephone set 1 during the telephone connection.

Even if the data indicating that no holding function is set, i.e., a telephone line in service is to be disconnected when a line or extension key is pressed during the telephone call, are stored in the RAM 264, the CPU 262 holds the telephone line in service when the user presses the hold key 11 on the pushbutton telephone set 1 shown in FIG. 3.

The CPU 262 also stores, in the RAM 264, data representing a period of time, e.g., 2 seconds, for which a telephone line that carries a call is to be maintained by the CPU 262. This period of time for holding a telephone connection may be set to a suitable value depending on the user of the pushbutton telephone set 1. For example, if the user of the pushbutton telephone set 1 is relatively slow in pressing various keys on the pushbutton telephone set 1, then the period of time for holding a telephone connection may be increased for the user to correct an erroneous operation in which the line or extension key has been pressed without pressing the hold key. If the user of the pushbutton telephone set 1 is relatively quick in pressing various keys on the pushbutton telephone set 1, then the period of time for holding a telephone connection may be reduced for the user to correct an erroneous operation in which the line or extension key has been pressed without pressing the hold key. In this manner, the user can vary the efficiency of the pushbutton telephone set 1 depending on the user's individual rate at which he or she can press the keys on the pushbutton telephone set 1.

To set such a period of time for holding a telephone connection, the user presses a certain key on the pushbutton telephone set 1 to send a time setting request from the pushbutton telephone set unit 21 through the control data highway 24 and the one-chip microcomputer 261 to the CPU 262. In response to the time setting request, the CPU 262 stores new time data or rewrite the existing time data with new time data in the RAM 264. A program for setting a period of time for holding a telephone connection is also stored in the ROM 263.

According to the first embodiment, as described above, when one of the line keys or the extension key on the pushbutton telephone set 1 is pressed during a telephone connection, provided the RAM 264 is storing preset data representing a hold function to hold the telephone line which is in service, i.e., through which the telephone connection is being established, the CPU 262 holds the telephone line in service, and thereafter makes a connection through a line corresponding to the depressed line or extension key. Therefore, the telephone line that is in service is prevented from being disconnected by the depression of the line or extension key. Furthermore, the CPU 262 measures a period of time that has elapsed after the pushbutton telephone set 1 has captured a telephone line when the line or extension key is pressed during a telephone connection, and if the measured period of time is not equal to or longer than a predetermined value, e.g., 2 seconds, the CPU 262 does not judge that the pushbutton telephone set 1 is in service. Therefore, any simple repeated depression of one of the line keys or the extension key during that period of time is ineffective to hold the telephone connection.

Figure 6:
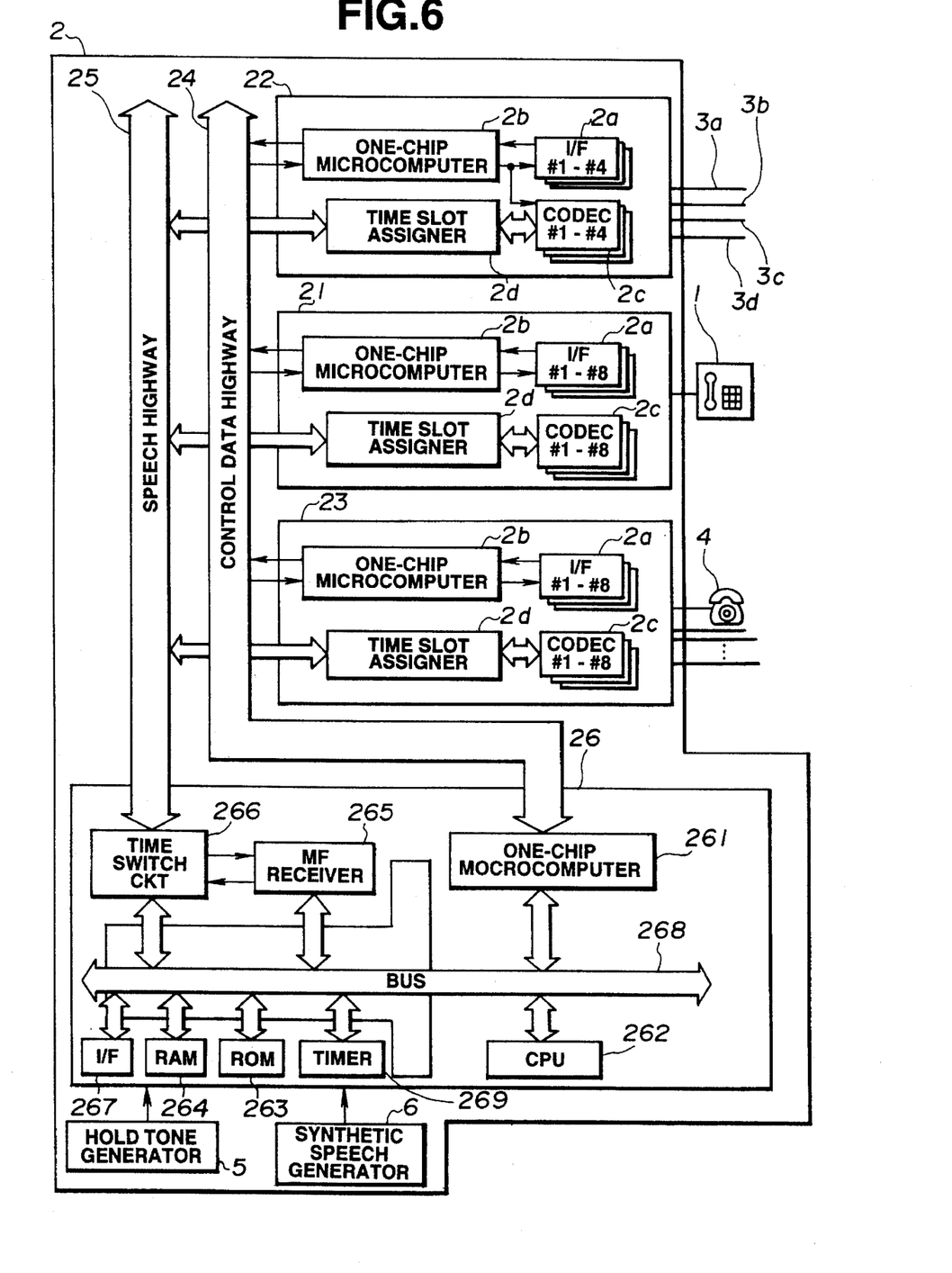
FIG. 6 is a block diagram of a pushbutton telephone system according to a second embodiment of the present invention.

FIG. 6 shows in block form a pushbutton telephone system according to a second embodiment of the present invention. The pushbutton telephone system shown in FIG. 6 is similar to the pushbutton telephone system shown in FIG. 2 except that a synthetic speech generator 6 and a timer 269 are added.

Figure 7:
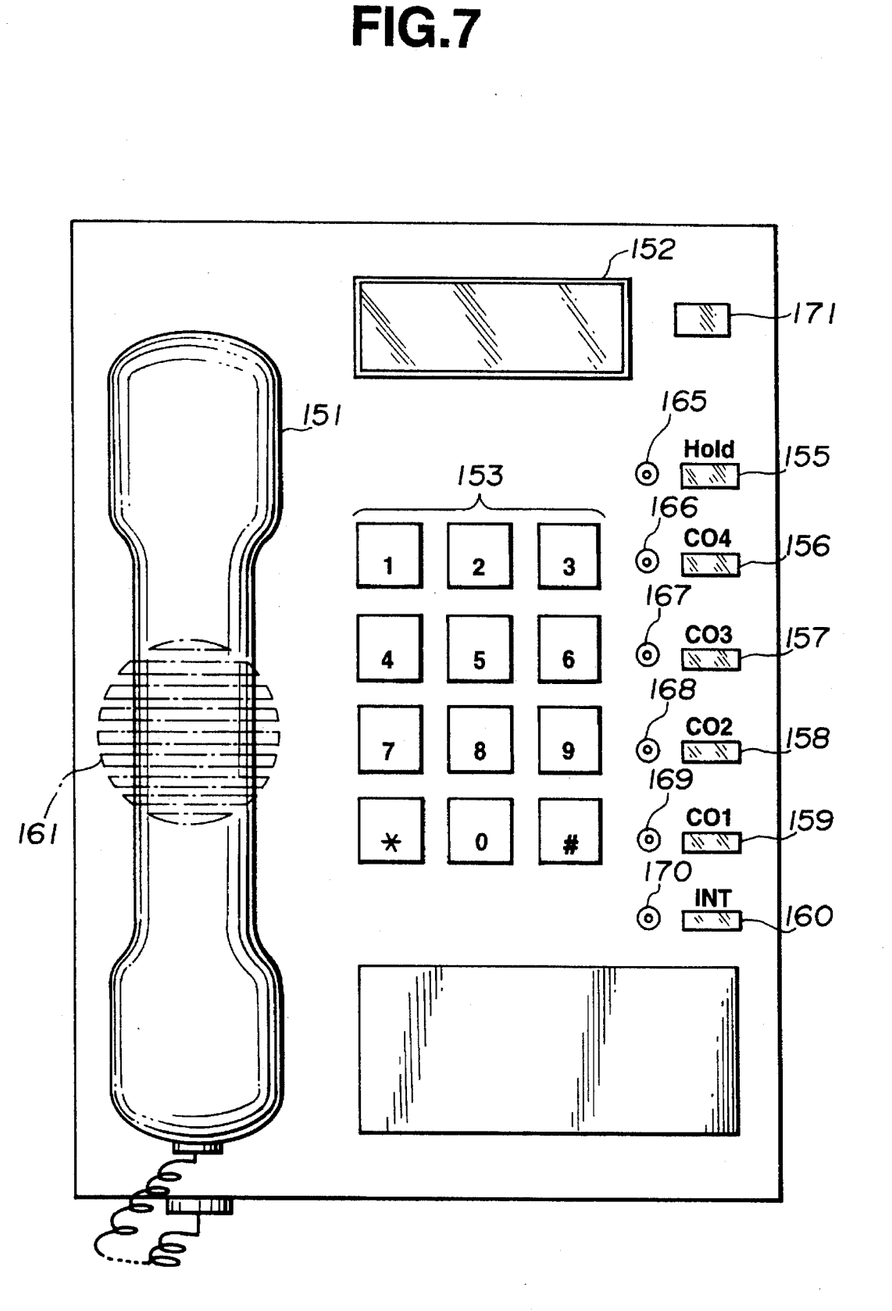
FIG. 7 is a plan view of a pushbutton telephone set of the pushbutton telephone system shown in FIG. 6.

A pushbutton telephone set of the pushbutton telephone system shown in FIG. 6 is illustrated in FIG. 7. As shown in FIG. 7, the pushbutton telephone set has a handset 151, a liquid crystal display (LCD) panel 152 for displaying operation data, a pushbutton dialing pad 153, a hold key 155, a plurality of line keys 156, 157, 158, 159, an extension key 160, a loudspeaker 161, and a plurality of light-emitting diodes (LEDs) 165, 166, 167, 168, 169, 170 which are positioned near and associated with the hold key 155, the line keys 156~159, and the extension key 160, respectively. The LCD 152, the loudspeaker 161, and the LEDs 165~170 are controlled by the pushbutton telephone set unit 21 shown in FIG. 6.

Figure 8:
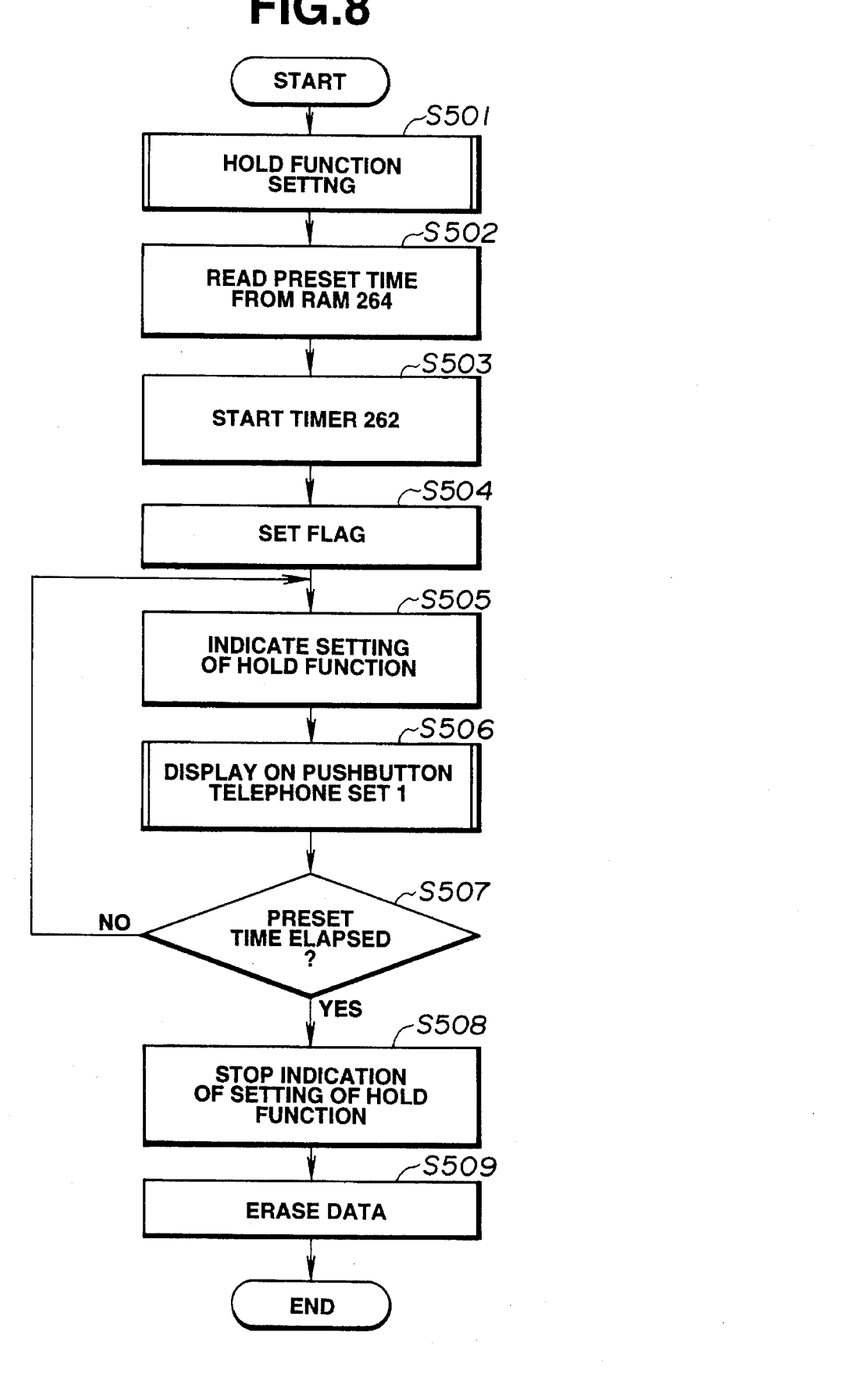
FIG. 8 is a flowchart of a processing sequence that is executed for indicating the setting of a hold function with visual or audio information.

The pushbutton telephone system shown in FIG. 6 operates as follows:

FIG. 8 is a processing sequence that is executed by the CPU 262 for indicating the setting of a hold function with a synthetic or buzzer sound and the LEDs 166~170. In FIG. 8, the CPU 262 determines whether a hold function is set or not when one of the like keys or the extension key is pressed, in the step S303 shown in FIG. 4, and if the hold function is set, then the CPU 262 displays a preset period of time, e.g., 2 seconds, for holding a telephone connection according to the hold function, on the LCD 152. More specifically, if the hold function is set in a step S501, then the CPU 262 reads data representing the preset period of time for holding a telephone connection from the RAM 264 in a step S502. Then, the CPU 262 starts the timer 269 to measure time in a step S503, and stores the time being measured together with a flag in a certain stored area in the RAM 264 in a step S504. The CPU 262 sends information indicating that the hold function is set to the pushbutton telephone set 1 through the one-chip microcomputer 261, the control data highway 24, and the pushbutton telephone set unit 21 in a step S505.

Figure 7A:
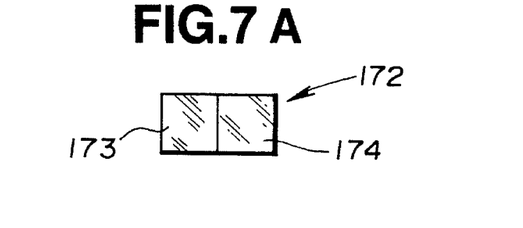
FIGS. 7A and 7B are plan views of modified pushbutton telephone sets.
Figure 7B:
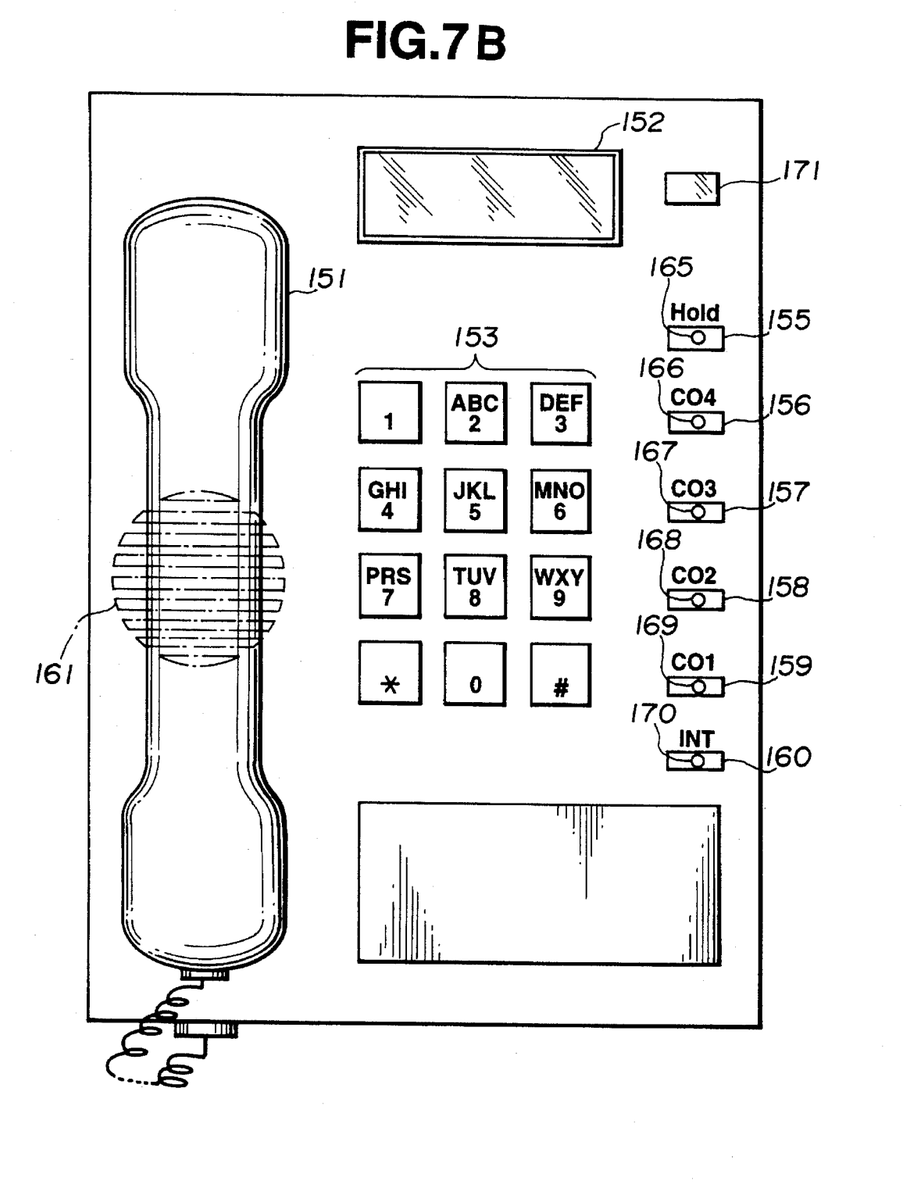

The pushbutton telephone set 1 is controlled by a one-chip microcomputer (not shown) therein to display the delivered information on the LCD 152 (see FIG. 7) in a step S506. Specifically, the LCD 152 displays letters "HOLD FUNCTION SET. WITHIN TIME FOR HOLDING LINE IN SERVICE.", for example. The CPU 262 also reads synthetic speech data representing "HOLD FUNCTION SET." from the synthetic speech generator 6, and sends the synthetic speech data to the pushbutton telephone set 1 through the control data highway 24 and the pushbutton telephone set unit 21. Then, the pushbutton telephone set 1 radiates the sound "HOLD FUNCTION SET." from the loudspeaker 161. The user may store data for controlling the display of the information and the generation of the sound into the RAM 264 through the pushbutton telephone set 1 such that one or both of the information display and the sound generation may be carried out. An intermittent buzzer sound indicating the setting of the hold function may also be produced by a buzzer 171 on the pushbutton telephone set 1. When the pushbutton telephone set 1 is supplied with the information indicating "HOLD FUNCTION SET. WITHIN TIME FOR HOLDING LINE IN SERVICE.", it may be displayed on the LCD 152 and indicated by the flickering of one of the LEDs 166~170 associated with the line and extension keys 156~160 in service. As shown in FIG. 7A, each of the LEDs 166~170 may comprise a two-color light-emitting diode 172 having two color sections 173, 174 which may be alternately and intermittently turned on. As shown in FIG. 7B, the LEDs 166~170 may be incorporated in the respective line and extension keys 156~160.

Thereafter, the CPU 262 reads the time being measured by the timer 269 from the RAM 269, and determines whether the time has exceeded the preset period of time, e.g., 2 seconds, in a step S507. If not, then control returns to the step S505. If the time has exceeded the preset period of time, then the CPU 262 stops the indication of the setting of the hold function to the pushbutton telephone set 1 in a step S508. Thereafter, the CPU 262 erases the time data stored with the flag in the RAM 269 in a step 509.

Inasmuch as the setting of the hold function is indicated by the LCD 152, the synthetic sound, the buzzer sound, and/or the flickering of the LEDs 166~170, the user can quickly recognize the setting of the hold function and can operate the pushbutton telephone set 1 highly efficiently without being puzzled in switching to and from the extension line, for example.

Figure 9:
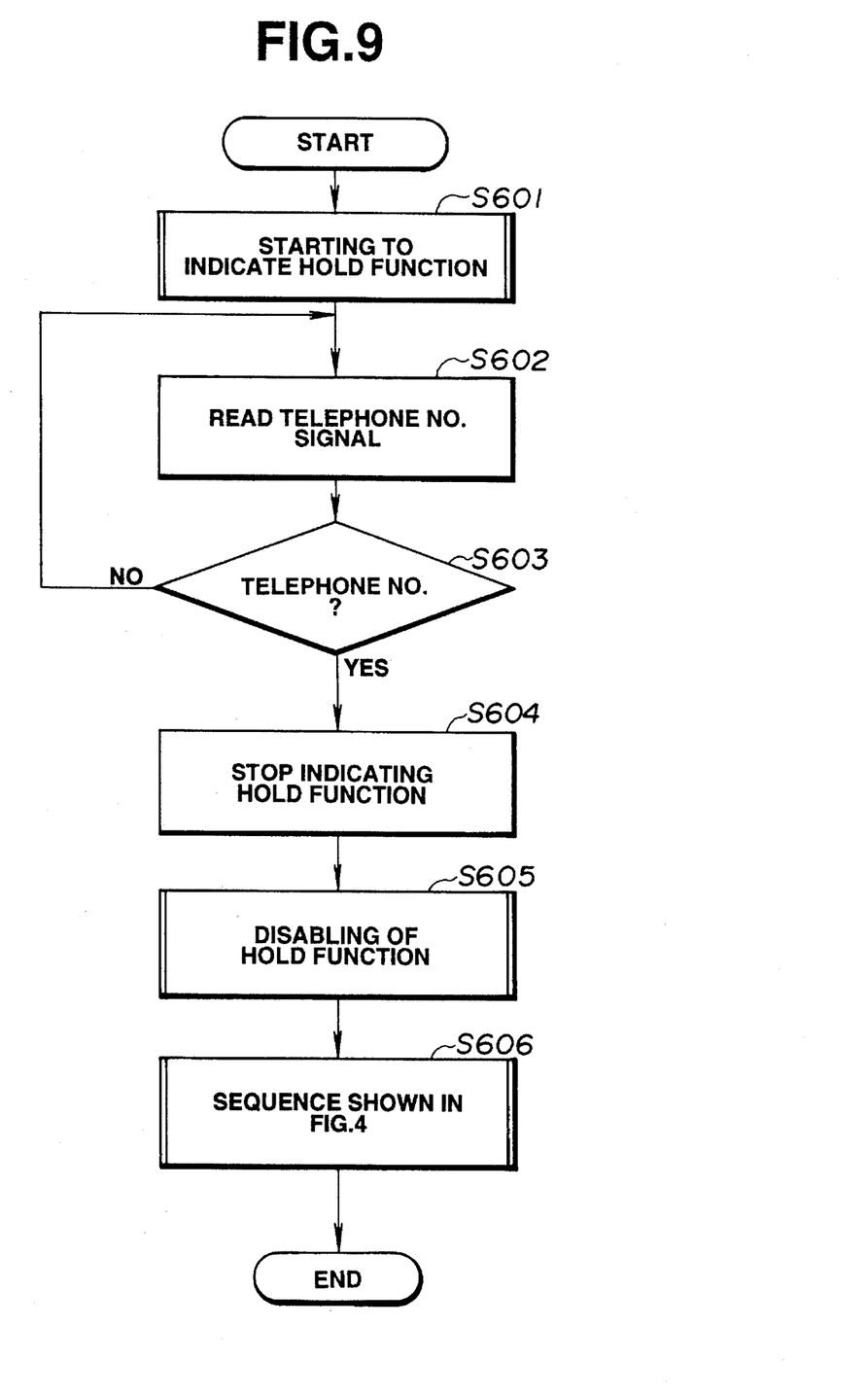
FIG. 9 is a flowchart of a processing sequence that is executed for disabling a hold function when a telephone number is entered.

FIG. 9 shows a processing sequence that is executed by the CPU 262 for disabling a hold function when a telephone number is entered from the pushbutton dialing pad 153 of the pushbutton telephone set 1 by the user after the setting of the hold function has started being indicated to the pushbutton telephone set 1 in the step 505 shown in FIG. 8. As shown in FIG. 9, when a telephone number is entered from the pushbutton dialing pad 153 after the setting of the hold function has started being indicated to the pushbutton telephone set 1 in the step 505 shown in FIG. 8, the CPU 262 reads a telephone number signal (pulsing signal) of the entered telephone number through the pushbutton telephone set unit 21, the control data highway 24, and the one-chip microcomputer 261 in steps S601, S602. Then, the CPU 262 determines whether the telephone number signal represents a telephone number or not in a step S603. If not, control goes back to the step S602. If the telephone number signal represents a telephone number, then the CPU 262 forcibly stops the indication of the setting of the hold function to the pushbutton telephone set 1 in a step S604. Thereafter, the CPU 262 disables the hold function in a step S605. More specifically, the CPU 262 indicates the disabling of the hold function to the pushbutton telephone set 1 through the one-chip microcomputer 261, the control data highway 24, and the pushbutton telephone set unit 21. The pushbutton telephone set 1 is controlled by the non-illustrated one-chip microcomputer therein to turn off the display of the letters "HOLD FUNCTION SET. WITHIN TIME FOR HOLDING LINE IN SERVICE." on the LCD 152 and also turn off the synthetic speech output. The pushbutton telephone set 1 also de-energizes the buzzer and the LEDs 166~170. Thereafter, the CPU 262 executes the processing sequence shown in FIG. 4 in a step S606 which is carried out when one of the line keys 156~159 or the extension key 160 is pressed during a telephone connection.

Since a hold function is disabled when a telephone number is entered through the pushbutton dialing pad 153 of the pushbutton telephone set 1 after the setting of the hold function has started to be indicated to the pushbutton telephone set 1, as described above, the user can quickly select a desired one of the telephone lines 3a~3d with the corresponding line keys 156~159 without have to wait for the preset period of time for holding a telephone connection to elapse. Accordingly, the user can operate the pushbutton telephone set 1 highly efficiently.

Figure 10:
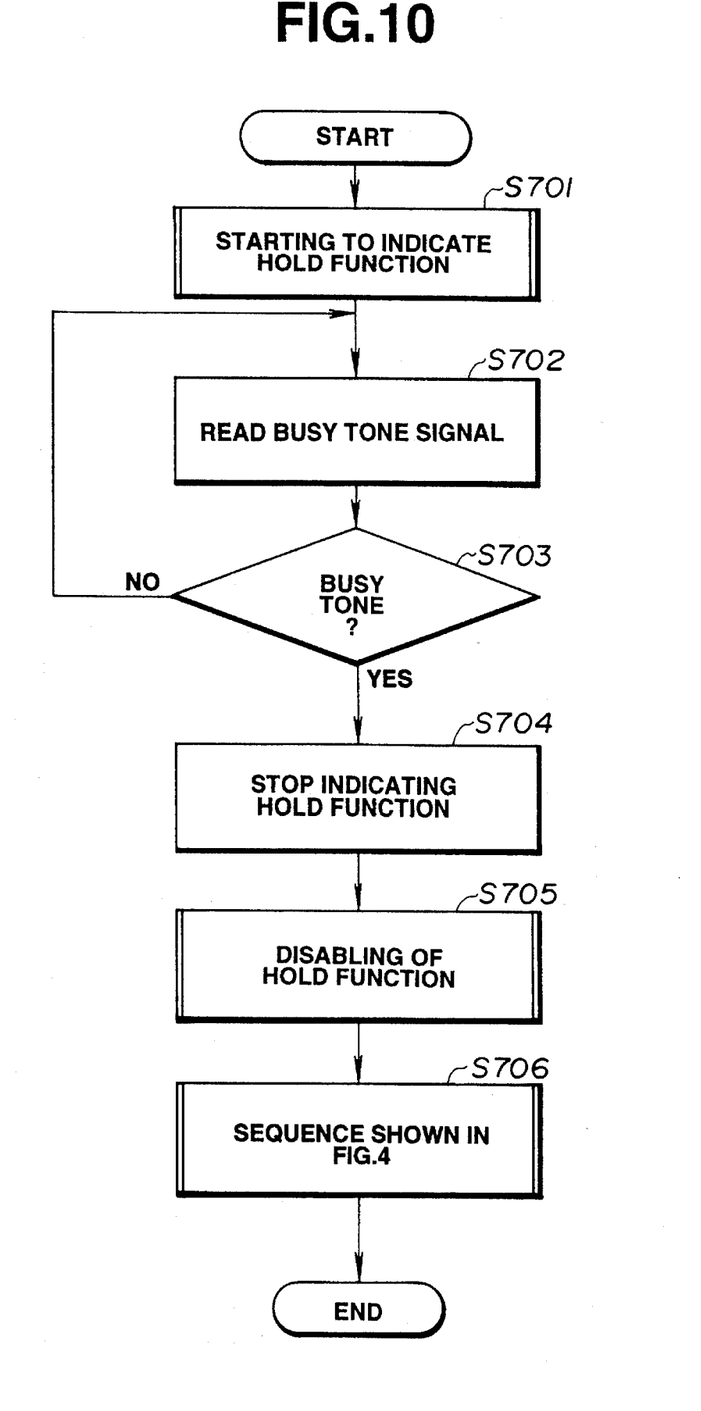
FIG. 10 is a flowchart of a processing sequence that is executed for disabling a hold function when a busy tone is detected.

FIG. 10 illustrates a processing sequence that is executed by the CPU 262 for disabling a hold function when one of the line keys 156~159 is pressed and a busy tone signal is sent from an exchange of a public telephone network to the telephone line which corresponds to the pressed line key. As shown in FIG. 10, when one of the line keys 156~159 is pressed and a busy tone signal is sent from an exchange of a public telephone network to the telephone line which corresponds to the pressed line key after the setting of a hold function has started being indicated to the pushbutton telephone set 1 in the step 505 shown in FIG. 8, the CPU 262 reads a busy tone signal through the telephone line unit 22, the control data highway 24, and the one-chip microcomputer 261 in steps S701, S702. Then, the CPU 262 determines whether the busy tone signal represents a busy tone or not in a step S703. If not, control goes back to the step S702. If the busy tone signal represents a busy tone, then the CPU 262 forcibly stops the indication of the setting of the hold function to the pushbutton telephone set 1 in a step S704. Thereafter, the CPU 262 disables the hold function in a step S705. More specifically, the CPU 262 indicates the disabling of the hold function to the pushbutton telephone set 1 through the one-chip microcomputer 261, the control data highway 24, and the pushbutton telephone set unit 21. The pushbutton telephone set 1 is controlled by the non-illustrated one-chip microcomputer therein to turn off the display of the letters "HOLD FUNCTION SET. WITHIN TIME FOR HOLDING LINE IN SERVICE." on the LCD 152 and also turn off the synthetic speech output. The pushbutton telephone set 1 also de-energizes the buzzer and the LEDs 166~170. Thereafter, the CPU 262 executes the processing sequence shown in FIG. 4 in a step S706 which is carried out when one of the line keys 156–159 or the extension key 160 is pressed during a telephone connection.

Since a hold function is disabled when one of the line keys 156–159 is pressed and a busy tone signal is sent from an exchange of a public telephone network to the telephone line which corresponds to the pressed line key after the setting of the hold function has started to be indicated to the pushbutton telephone set 1, as described above, the user can quickly select a desired one of the telephone lines 3a–3d with the corresponding line keys 156–159 without have to wait for the preset period of time for holding a telephone connection to elapse. Accordingly, the user can operate the pushbutton telephone set 1 highly efficiently.

Although certain preferred embodiments of the present invention has been shown and described in detail, it should be understood that various changes and modifications may be made therein without departing from the scope of the appended claims.

What is claimed is:

1. A pushbutton telephone system comprising:

a plurality of telephone lines and an extension line;

at least one pushbutton telephone set connected to said telephone lines and said extension line and having a plurality of line keys associated with said telephone lines, respectively, and an extension key associated with said extension line;

timer means for measuring a period of time which elapses after said pushbutton telephone set captures one of the telephone lines until one of said line keys or said extension key is pressed;

decision means for determining whether one of said telephone lines is carrying a call when one of said line keys or said extension key is pressed, by determining whether the period of time which is measured by said timer means is longer than a preset period of time;

holding means for holding said one of the telephone lines which is carrying a call when said one of said line keys or said extension key is pressed if said one of the telephone lines is determined as carrying a call by said decision means; and control means for controlling said pushbutton telephone set to capture one of said telephone lines or said extension line which corresponds to the pressed one of said line keys or said extension key when said one of the telephone lines which is carrying a call is held by said holding means.

2. A pushbutton telephone system according to claim 1, wherein said holding means comprises means for holding said one of the telephone lines which is carrying a call for 2 seconds.

3. A pushbutton telephone system according to claim 1, further comprising setting means for setting and modifying a period of time for which said one of the telephone lines which is carrying a call is held by said holding means.

4. A pushbutton telephone system according to claim 1, further comprising indicating means for sending a signal indicating the setting of a hold function to hold said one of the telephone lines which is carrying a call with said holding means to said pushbutton telephone set when said decision means is activated and sending a signal indicating a disabling of said hold function to said pushbutton telephone set when said preset period of time elapses.

5. A pushbutton telephone system according to claim 1, further comprising synthetic speech supply means for supplying a synthetic speech signal indicating the setting of a hold function to hold said one of the telephone lines which is carrying a call with said holding means to said pushbutton telephone set when said decision means starts to determine whether said one of the telephone lines is carrying a call based on said period of time.

6. A pushbutton telephone system according to claim 5, wherein said pushbutton telephone set has audio output means for producing a sound represented by said synthetic speech signal which is supplied to said pushbutton telephone set.

7. A pushbutton telephone system according to claim 4, wherein said pushbutton telephone set has visual display means for displaying visual information represented by said signal indicating the setting of a hold function.

8. A pushbutton telephone system according to claim 7, wherein said visual display means comprises means for displaying the visual information as letters.

9. A pushbutton telephone system according to claim 7, wherein said visual display means comprises light-emitting means for emitting light as said visual information.

10. A pushbutton telephone system according to claim 9, wherein said light-emitting means comprises means for emitting flickering light as said visual information.

11. A pushbutton telephone system according to claim 9, wherein said light-emitting means comprises two-color light-emitting means for alternately and intermittently turning on two color signals.

12. A pushbutton telephone system according to claim 4, wherein said pushbutton telephone set has buzzer means for producing a buzzer sound represented by said signal indicating the setting of a hold function.

13. A pushbutton telephone system according to claim 12, wherein said buzzer means comprises means for producing an intermittent buzzer sound represented by said signal indicating the setting of a hold function.

14. A pushbutton telephone system according to claim 9, wherein said light-emitting means comprises a plurality of light-emitting elements positioned in said line keys, respectively.

15. A pushbutton telephone system according to claim 9, wherein said light-emitting means comprises a plurality of light-emitting elements positioned near said line keys, respectively.

16. A pushbutton telephone system according to claim 3, further comprising telephone number detecting means for detecting a telephone number signal representing a telephone number which is dialed by said pushbutton telephone set during said period of time set by said setting means, and indicating means for sending a signal indicating the disabling of said hold function to said pushbutton telephone set when a telephone number signal is detected by said telephone number detecting means.

17. A pushbutton telephone system according to claim 16, wherein said pushbutton telephone set has visual display means for displaying visual information represented by said signal indicating the setting of a hold function, further comprising means for de-energizing said visual display means when said signal indicating the disabling of said hold function is sent from said indicating means to said pushbutton telephone set.

18. A pushbutton telephone system according to claim 16, further comprising synthetic speech supply means for supplying a synthetic speech signal indicating the setting of a hold function to hold said one of the telephone lines which is carrying a call with said holding means to said pushbutton telephone set when said decision means starts to determine whether said one of the telephone lines is carrying a call based on said period of time, and means for deenergizing said synthetic speech supply means when said signal indicating the disabling of said hold function is sent from said indicating means to said pushbutton telephone set.

19. A pushbutton telephone system according to claim 16, wherein said pushbutton telephone set has light-emitting means for emitting light as said signal indicating the setting of a hold function, further comprising means for de-energizing said light-emitting means when said signal indicating the disabling of said hold function is sent from said indicating means to said pushbutton telephone set.

20. A pushbutton telephone system according to claim 16, wherein said pushbutton telephone set has buzzer means for producing a buzzer sound represented by said signal indicating the setting of a hold function, further comprising means for de-energizing said buzzer means when said signal indicating the disabling of said hold function is sent from said indicating means to said pushbutton telephone set.

21. A pushbutton telephone system according to claim 3, further comprising busy tone detecting means for detecting a busy tone signal from one of said telephone lines which corresponds to one of said line keys that is pressed during said period of time set by said setting means, and indicating means for sending a signal indicating the disabling of said hold function to said pushbutton telephone set when a busy tone signal is detected by said busy tone detecting means.

22. A pushbutton telephone system according to claim 21, wherein said pushbutton telephone set has visual display means for displaying visual information represented by said signal indicating the setting of a hold function, further comprising means for de-energizing said visual display means when said signal indicating the disabling of said hold function is sent from said indicating means to said pushbutton telephone set.

23. A pushbutton telephone system according to claim 21, further comprising synthetic speech supply means for supplying a synthetic speech signal indicating the setting of a hold function to hold said one of the telephone lines which is carrying a call with said holding means to said pushbutton telephone set when said decision means starts to determine whether said one of the telephone lines is carrying a call based on said period of time, and means for deenergizing said synthetic speech supply means when said signal indicating the disabling of said hold function is sent from said indicating means to said pushbutton telephone set.

24. A pushbutton telephone system according to claim 21, wherein said pushbutton telephone set has light-emitting means for emitting light as said signal indicating the setting of a hold function, further comprising means for de-energizing said light-emitting means when said signal indicating the disabling of said hold function is sent from said indicating means to said pushbutton telephone set.

25. A pushbutton telephone system according to claim 21, wherein said pushbutton telephone set has buzzer means for producing a buzzer sound represented by said signal indicating the setting of a hold function, further comprising means for de-energizing said buzzer means when said signal indicating the disabling of said hold function is sent from said indicating means to said pushbutton telephone set.

\* \* \* \* \*

UNITED STATES PATENT AND TRADEMARK OFFICE
CERTIFICATE OF CORRECTION

PATENT NO. : 5,483,584
DATED : January 09, 1996
INVENTOR(S) : Hiroaki HAYASHI et al It is certified that error appears in the above-indentified patent and that said Letters Patent is hereby corrected as shown below:

Claim 18, Column 12, line 67, "deenergizing" should read --de-energizing--;

Claim 23, Column 14, line 11, "deenergizing" should read --de-energizing--.

Signed and Sealed this

Twenty-second Day of October, 1996

*Attest:*

BRUCE LEHMAN

*Attesting Officer*     *Commissioner of Patents and Trademarks*